Patented Feb. 8, 1949

2,461,302

UNITED STATES PATENT OFFICE 2,461,302

METHOD OF FLAMEPROOFING

John Truhlar, Clarendon Hills, and Athan A. Pantsios, Chicago, Ill., assignors to Rudolf F. Hlavaty, Cicero, Ill.

No Drawing. Application July 28, 1945, Serial No. 607,659

1 Claim. (Cl. 117—138)

This invention relates primarily to a process for fireproofing and flameproofing material. Among the materials which can be treated according to the method of this invention are fibers, natural and synthetic, fabrics, textiles, wood fiber, vegetable, mineral and animal fiber, felted, woven or otherwise arranged and cellulosic materials generally. Although other materials may be treated according to the method herein disclosed the materials for which the treatment has probably the greatest importance are those mentioned.

Another object is to provide a method and a material for use in the method which can be readily used to accomplish flameproofing, fireproofing and glowproofing without any corrosive or other deleterious effect both upon the material treated and upon such materials as it may contact. The method of this invention permits the convenient use of materials which are otherwise of limited use, among other reasons because of their corrosive or damaging effect upon material which is treated by them.

Another object of the invention is to provide a method whereby antimony oxide can be deposited within as well as upon material.

Other objects will appear from time to time in the course of the specification and claim.

In the past it has been recognized that antimony oxides are for many purposes satisfactory and relatively permanent fireproofing agents. However methods for their application to materials to be fireproofed as heretofore known are difficult, slow, tedious and unsatisfactory. In general previous methods of applying antimony oxide for fireproofing have included the steps of dusting on or depositing or otherwise fastening or binding the antimony oxide generally in the form of a suspension.

Where methods of the past have been used the antimony oxide is held on rather than in the material and does not effectively penetrate it. One of the objects of the invention is therefore to provide a method for applying antimony oxides to material to be fireproofed whereby the antimony oxide is deposited within as well as upon the materials treated. Since such oxides are insoluble in water and in all organic solvents, material so treated is permanently fireproofed and can be washed and dry cleaned without danger of removing the antimony oxide or otherwise destroying the fireproof quality of the material which has been treated with it.

In carrying out the method of this invention the material to be treated is impregnated with antimony chloride. This may be done either by immersing the material in a solution of antimony chloride in a penetrating organic solvent or by exposing the material after first wetting it with the solvent in a partially evacuated system or container to the vapors of boiling antimony chloride. The antimony chloride is then absorbed selectively on the material by the solvent which is already present on the material. The material thus impregnated with antimony chloride and the solvent is treated with steam which converts the chlorides present into oxides after the well recognized chemical reactions.

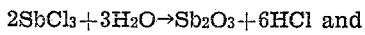

and

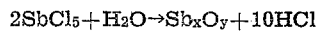

The antimony oxides now present in the material which has been treated are in themselves effective flameproofing agents. As above pointed out they are insolvent in water and in all organic solvents. Hence having been deposited on or formed on or in the material under treatment they remain permanently present. The steam not only makes possible the reaction above set out but also removes the hydrochloric acid formed as a result of that reaction and hence this normally corrosive and destructive material is removed during the process as a result of the presence of the steam.

Since antimony chlorides are first deposited on and in the material under treatment and since hydrochloric acid may be formed at this time or may be present at this time it is important to accomplish the conversion from antimony chlorides to antimony oxides by the interaction of steam or water as rapidly as possible. This is necessary to obviate the destructive action of the hydrochloric acid on the material under treatment. Hence the steam is applied as rapidly as possible after the material under treatment has been impregnated with the antimony chloride. Further to minimize the destructive action of the hydrochloric acid moisture is as far as possible entirely excluded from the system in which the treatment takes place and from the impregnating solutions as well.

We have spoken of the detrimental effect of the hydrochloric acid which may be present or which may be formed during the treatment of the material. We have also discovered that it is possible largely if not entirely to obviate the detrimental action of the hydrochloric acid by the presence in the solution or the vapors or on the material itself during treatment of organic phosphites or organic phosphates. These materials inhibit the destructive action of the acid until it is removed by the steam or neutralized. They also enhance the flameproofing quality of antimony oxide since both the organic phosphites and organic phosphates are fire retarding agents.

We have described above in general outline the method by which the material to be treated is impregnated with antimony chloride by several different methods. In addition to these methods some of the steps may be further modified. In particular the antimony chlorides may be converted to oxides and the acid formed by the reaction may be eliminated or neutralized according to anyone of the following alternative steps in the procedure.

(a) The material under treatment after impregnation with antimony chloride may be dipped in water and then in ammonia in such quantity to neutralize the acid.

(b) The material under treatment after thorough steaming may be exposed to the vapors of ammonia which vapors will neutralize all traces of the acid.

(c) The material under treatment after impregnation with antimony chloride may be dipped in a solution of water and any weak alkaline or base material to neutralize the acid.

(d) The material under treatment after impregnation with antimony chlorides may be treated with steam containing a volatile base to neutralize the acids.

We have spoken above of one form of the method of this invention in which material to be treated is immersed in a solution of antimony chlorides. Obviously a solvent is required and any inert low boiling solvent may be used. In practice we have found that a low boiling ketone is satisfactory. Among these are acetone or methyl ethyl ketone, chlorinated solvents and esters. These materials are preferably because they are readily available, cheap, easily removed and recovered and can be obtained commercially in a substantial anhydrous condition.

We have spoken above of the possibility of introducing the antimony chlorides in vaporous form to the material under treatment. As an absorbent for the antimony chloride vapors any good solvent for chlorides may be used. In general at the present we prefer to use di- or trialkyl and di and tri aryl phosphites or phosphates. These materials are useful and advantageous because they are not only solvents for the antimony chloride but are in themselves fireproofing agents and acid inhibitors as well.

Both antimony tri chloride and antimony penta chloride are suitable for use in the processes described above either in the dipping process or in the vapor process. In general we prefer to use the antimony tri chloride because of its lesser corrosive character, its greater availability and its present lower price. On the other hand oxides formed from the antimony penta chloride are generally less soluble in water than those formed from the antimony tri chloride and hence are more permanent.

The following specific example is given for purposes of illustration only and is not to be taken as limiting the method or the ingredients used. Therefore one example of a material which may be flameproofed is as follows:

A 100 gm. piece of cloth is immersed in a solution of 20% antimony chloride and 8% triphenyl phosphate. Tests have shown that the cloth will be completely wet in less than a minute. It is then quickly removed from the bath and is thoroughly steamed for from three to five minutes. Finally it is exposed to the vapors of ammonia and dried. The weight of the cloth in the dry condition is 130 gms. In the alternative a 100 gm. piece of cloth is sprayed with 6 gms. of tri amyl phosphite so that the latter is evenly distributed throughout the cloth. The cloth thus impregnated with the phosphite is placed in an enclosed chamber which is evacuated to about 30 m.m. of mercury pressure. Vapors of boiling antimony trichloride are led into the chamber and these are quickly absorbed selectively by the cloth. The material is then removed and steamed as in the first example. The weight of the cloth then dried will be found to be 127 gms. In both of the specific treatments above set out the cloth is flameproof and glowproof after treatment and drying.

The method is applicable to all combustible fibers, textiles, fabrics, cellulosic material and the like, natural and synthetic and such materials in any form can be flameproofed and glowproofed by one or another of the processes mentioned. The terms "fireproof" and "flameproof" is used herein to mean that the materials burn slowly or not at all when exposed in air to a direct flame.

We claim:

The process of flameproofing a quantity of material which includes the steps of dipping the material in a solution of antimony chloride and an organic phosphite, and thereafter steaming the impregnated material to convert the antimony chlorides to antimony oxides, the said solution containing 80 parts acetone, 20 parts antimony trichloride, and 8 parts triamyl phosphite.

JOHN TRUHLAR.
ATHAN A. PANTSIOS.

REFERENCES CITED

The following references are of record in the file of this patent:

UNITED STATES PATENTS

| Number | Name | Date |
| --- | --- | --- |
| 700,885 | Zuhl | May 27, 1902 |
| 1,388,824 | Arent | Aug. 23, 1921 |
| 1,388,825 | Arent | Aug. 23, 1921 |
| 2,323,387 | Edelstein | July 6, 1943 |

OTHER REFERENCES

Fireproofing of Textiles, by Textile Research Institute, Inc., New York city, N. Y., July 1943, page 6.